US009742205B2

United States Patent
Takai (10) Patent No.: US 9,742,205 B2
(45) Date of Patent: Aug. 22, 2017

(54) STORAGE STATUS ADJUSTING CIRCUIT, STORAGE STATUS ADJUSTING DEVICE, AND STORAGE BATTERY PACK

(71) Applicant: Masami Takai, Tokyo (JP)

(72) Inventor: Masami Takai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 107 days.

(21) Appl. No.: 14/658,416

(22) Filed: Mar. 16, 2015

(65) Prior Publication Data

US 2015/0263545 A1    Sep. 17, 2015

(30) Foreign Application Priority Data

Mar. 17, 2014  (JP) ................................ 2014-052944

(51) Int. Cl.
*H02J 7/00* (2006.01)
*H01M 10/42* (2006.01)

(52) U.S. Cl.
CPC ....... *H02J 7/0013* (2013.01); *H01M 10/4207* (2013.01); *H02J 7/007* (2013.01); *H02J 7/0014* (2013.01); *H02J 7/0019* (2013.01); *H02J 7/0052* (2013.01)

(58) Field of Classification Search
CPC .. H01M 10/4207; H02J 7/0013; H02J 7/0014; H02J 7/0019; H02J 7/0052; H02J 7/007
USPC ...................................................... 320/162
See application file for complete search history.

(56) References Cited

U.S. PATENT DOCUMENTS

| | | | |
|---|---|---|---|
| 8,164,305 B2 | 4/2012 | Zhang et al. | |
| 2012/0306451 A1 | 12/2012 | Arai | |
| 2013/0002203 A1 | 1/2013 | Kuraishi | |
| 2014/0070757 A1* | 3/2014 | Hong ................ | H02J 7/0054 320/103 |

(Continued)

FOREIGN PATENT DOCUMENTS

| | | |
|---|---|---|
| AT | 510355 A1 | 3/2012 |
| CN | 102111003 A | 6/2011 |

(Continued)

OTHER PUBLICATIONS

European search report dated Jul. 22, 2015 in corresponding European Patent Application No. 15158670.

(Continued)

*Primary Examiner* — Nathaniel Pelton
(74) *Attorney, Agent, or Firm* — Cooper & Dunham LLP (57) ABSTRACT

A storage status adjusting circuit includes: n (n is natural number greater than 2) switching units configured to switch between energy accumulation in respective n coils and energy release from the respective n coils to any one of component electric storage devices, which are respectively included in n assembled electric storage devices respectively including a plurality of the component electric storage devices; and n changing units configured to respectively change potential differences between both ends of the n coils; wherein the changing units change, based on the storage statuses of the n assembled electric storage devices, at least any one of the potential differences between both ends of the n coils, when accumulating energy in the n coils.

6 Claims, 7 Drawing Sheets

(56) References Cited

U.S. PATENT DOCUMENTS

2014/0349146 A1* 11/2014 Dittmann .............. H02J 7/0016
                   429/50
2015/0145520 A1* 5/2015 Kain .................. G01R 31/3662
                   324/430

FOREIGN PATENT DOCUMENTS

| | | |
|---|---|---|
| EP | 2541728 A2 | 1/2013 |
| JP | 2011-083182 | 4/2011 |
| JP | 2011-182484 | 9/2011 |
| JP | 2013-183555 | 9/2013 |
| JP | 2013-187930 | 9/2013 |
| JP | 2013-207906 | 10/2013 |
| JP | 2013-219994 | 10/2013 |
| WO | WO 2013/129602 A1 | 9/2013 |
| WO | WO 2013/133265 A1 | 9/2013 |
| WO | WO 2013/146905 A1 | 10/2013 |
| WO | WO 2013/154156 A1 | 10/2013 |

OTHER PUBLICATIONS

Chinese official action dated Dec. 16, 2016 (and English translation thereof) in connection with corresponding Chinese patent application No. 2015103495443.

* cited by examiner

STORAGE STATUS ADJUSTING CIRCUIT, STORAGE STATUS ADJUSTING DEVICE, AND STORAGE BATTERY PACK

BACKGROUND OF THE INVENTION

1. Field of the Invention

The present technology relates to a storage status adjusting circuit, a storage status adjusting device and a storage battery pack with respect to adjusting storage status of an electric storage device.

2. Description of the Related Art

A storage battery pack, having a plurality of secondary batteries (cells) connected in series, which has an electronic circuit to average cell voltages of the cells, has been known. As for averaging cell voltages, an active method, in which electricity is transferred between the cells, is gathering attention.

An electronic circuit adopting the active method has a transformer and a switching element for activating the transformer, accumulates electricity in a primary coil during the times when the switching element is turned on, and outputs electricity accumulated in the primary coil to a secondary coil when the switching element is turned off.

Further, in such an electronic circuit, technology for averaging voltages of taps is proposed, wherein a plurality of secondary batteries are divided into groups to from respective taps.

Specifically, for example, it is known that one transformer is disposed in every tap to form a plurality of transformers, or that transformers are used for averaging voltages of the taps while a convertor is used for averaging cell voltages within each of the taps (for example, Japanese Laid-open Patent Publication No. 2013-187930, No. 2013-183555, No. 2013-219994, No. 2013-207906).

However, in an electronic circuit adopting the active method, energy-loss by the transformer is large.

RELATED ART DOCUMENT

Patent Document

[Patent Document 1]: Japanese Laid-open Patent Publication No. 2013-187930
[Patent Document 2]: Japanese Laid-open Patent Publication No. 2013-183555
[Patent Document 3]: Japanese Laid-open Patent Publication No. 2013-219994
[Patent Document 4]: Japanese Laid-open Patent Publication No. 2013-207906

SUMMARY OF THE INVENTION

An object of disclosure of the present technology is to reduce energy-loss.

The following configuration is adopted to achieve the aforementioned object.

In one aspect of the embodiment, a storage status adjusting circuit includes: n (n is natural number greater than 2) switching units configured to switch between energy accumulation in respective n coils and energy release from the respective n coils to any one of component electric storage devices, which are respectively included in n assembled electric storage devices respectively including a plurality of the component electric storage devices; and n changing units configured to respectively change potential differences between both ends of the n coils; wherein the changing units change, based on the storage statuses of the n assembled electric storage devices, at least any one of the potential differences between both ends of the n coils, when accumulating energy in the n coils.

Other objects, features and advantages of the present invention will become more apparent from the following detailed description when read in conjunction with the accompanying drawings.

DETAILED DESCRIPTION OF THE PREFERRED EMBODIMENTS

Figure 1:
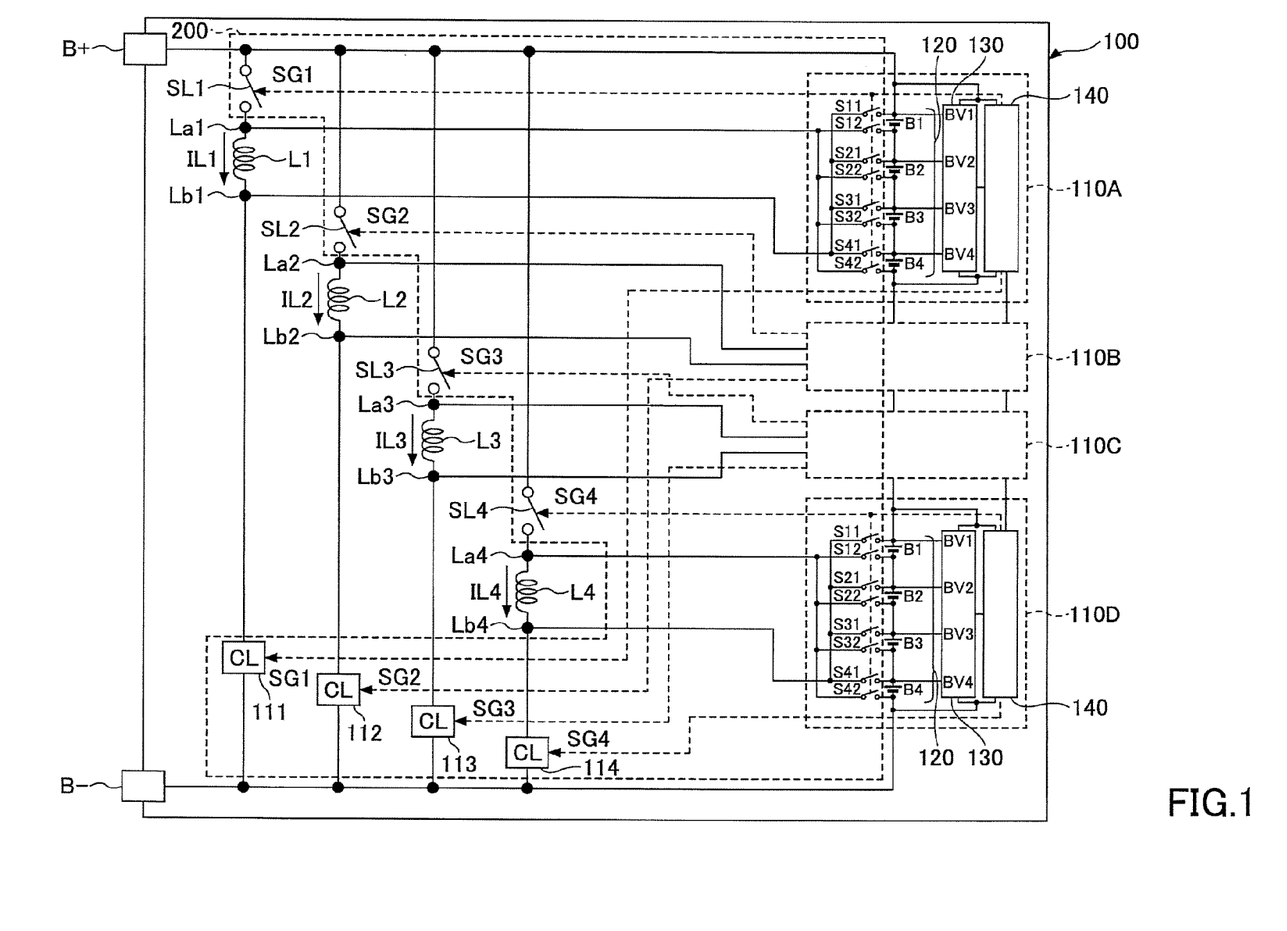
FIG. 1 is an illustration diagram of a storage battery pack.

Herein below, embodiments will be described with reference to the accompanying drawings. FIG. 1 is an illustration diagram of a storage battery pack.

A storage battery pack 100 of the present embodiment includes a B+ terminal, a B− terminal, coils L1, L2, L3 and L4, current limiting circuits 111, 112, 113 and 114, storage modules 110A, 110B, 110C and 110D and switching elements SL1, SL2, SL3 and SL4.

In the storage battery pack 100 of the present embodiment, the storage modules 110A, 110B, 110C and 110D respectively have identical configurations. The storage modules 110A, 110B, 110C and 110D of the present embodiment respectively include assembled battery 120 switching elements S11, S12, S21, S22, S31, S32, S41 and S42, a cell voltage detecting circuit 130, and controller 140. The assembled battery 120 is formed by connecting secondary batteries B1, B2, B3 and B4 in series.

Although the present embodiment is directed to a configuration in which the assembled battery 120 has the four secondary batteries B1-B4, this is not a limiting example. The secondary batteries may be configured with such as electric double-layer capacitors, or the like. Although the present embodiment is directed to a configuration in which the assembled battery 120 includes four secondary batteries, this is not a limiting example. The number of the secondary batteries included in the assembled battery 120 may be any number that is two or more.

The storage battery pack 100 of the present embodiment supplies electricity accumulated in the assembled battery 120 to a load connected through the B+ terminal and the B− terminal. Also, the storage battery pack 100 of the present embodiment charges the secondary batteries in the assembled battery 120 by a battery charger connected through the B+ terminal and the B− terminal.

The storage battery pack 100 of the present embodiment adjusts a status of electric energy storage (i.e. storage status) in each of the secondary batteries, by a storage status adjusting circuit 200 which is formed by switching elements included in each storage module, current limiting circuits 111, 112, 113 and 114, and switching elements SL1, SL2, SL3 and SL4.

More specifically, in each of the storage modules, the storage adjusting circuit 200 performs, in each storage module, averaging cell voltages of the secondary batteries B1-B4 included in the assembled battery 120, and further performs averaging voltages of assembled batteries 120 included in respective storage modules. The voltage of each assembled battery 120 is, so to speak, a potential difference between an electric potential at a positive electrode of the secondary battery B1 and an electric potential at a negative electrode of the secondary battery B4, in each storage module.

In the following, averaging voltages of the assembled batteries 120 included in respective storage modules will be described.

In the battery pack 100 of the present embodiment, controllers 140 in respective storage modules can communicate each other. In the present embodiment, a controller 140, among four controllers corresponding to four storage modules, is set to serve as a highest order controller which performs controlling processes in higher order than the other controllers. The highest order controller compares the voltages (the potential differences between the electric potentials at the positive electrodes of the secondary batteries B1 and the electric potentials at the negative electrodes of the secondary batteries B4) of the assembled batteries 120 corresponding to respective storage modules.

Then, the highest order controller changes the amount of energy accumulated in coils corresponding to respective storage modules, thereby performs averaging voltages of the assembled batteries 120 included in respective storage modules. The changing amount of energy, for example, can be performed by changing the value of coil current of respective coils.

Additionally, although the present embodiment is directed to a configuration, in which any one of the four controllers 140 is set to serve as a highest order controller, this is not a limiting example. In the present embodiment, other than the controllers 140 included in respective storage modules, a controller, which has similar function to that of the highest order controller described below, may be disposed. And, although the present embodiment is directed to a configuration in which the storage battery pack 100 includes four storage modules, this is not a limiting example. Any number of storage modules may be included in the storage battery pack 100.

In the following, connections between parts in the storage battery pack 100 will be described.

Each of the switching elements in the storage status adjusting circuit 200 of the present embodiment is, for example, a MOSFET (Metal-Oxide-Semiconductor Field-Effect Transistor), or the like.

In the present embodiment, one end of the switching elements SL1, SL2, SL3 and SL4 are respectively connected with the B+ terminal.

The other end of the switching element SL1 is connected with one end of the coil L1. In FIG. 1, a connecting point between the coil L1 and the switching element SL1 is shown as a connecting point La1. The other end of the coil L1 is connected with one end of the current limiting circuit 111. In FIG. 1, a connecting point between the other end of the coil L1 and one end of the current limiting circuit 111 is shown as a connecting point Lb1. The other end of current limiting circuit 111 is connected with the B− terminal.

The other end of the switching element SL2 is connected with one end of the coil L2. In FIG. 1, a connecting point between the coil L2 and the switching element SL2 is shown as a connecting point La2. The other end of the coil L2 is connected with one end of the current limiting circuit 112. In FIG. 1, a connecting point between the other end of the coil L2 and one end of the current limiting circuit 112 is shown as a connecting point Lb2. The other end of current limiting circuit 112 is connected with the B− terminal.

The other end of the switching element SL3 is connected with one end of the coil L3. In FIG. 1, a connecting point between the coil L3 and the switching element SL3 is shown as a connecting point La3. The other end of the coil L3 is connected with one end of the current limiting circuit 113. In FIG. 1, a connecting point between the other end of the coil L3 and one end of the current limiting circuit 113 is shown as a connecting point Lb3. The other end of current limiting circuit 113 is connected with the B− terminal.

The other end of the switching element SL4 is connected with one end of the coil L4. In FIG. 1, a connecting point between the coil L4 and the switching element SL4 is shown as a connecting point La4. The other end of the coil L4 is connected with one end of the current limiting circuit 114. In FIG. 1, a connecting point between the other end of the coil L4 and one end of the current limiting circuit 114 is shown as a connecting point Lb4. The other end of current limiting circuit 114 is connected with the B− terminal.

Additionally, a detailed description of the current limiting circuits 111, 112, 113 and 114 will be given later.

In the present embodiment, the secondary batteries B1-B4 included in the storage modules 110A, 110B, 110C and 110D are respectively connected in series between the B+ terminal and the B− terminal. More specifically, a positive electrode of the secondary battery B1 of the storage module 110A is connected with the B+ terminal, while a negative electrode of the secondary battery B4 of the storage module 110D is connected with the B− terminal.

The storage module 110A corresponds to the switching element SL1, the coil L1 and the current limiting circuit 111. A storage status of the secondary batteries B1-B4 of the storage module 110A is adjusted by the switching elements S11, S12, S21, S22, S31, S32, S41 and S42, the switching element SL1 and the current limiting circuit 111 included in the storage module 110A.

Further, the storage module 110A includes the cell voltage detecting circuit 130 and the controller 140. The controller 140 of the storage module 110A generates a control signal SG1 to be provided to the switching element SL1 and the current limiting circuit 111. Also, the controller 140 of the storage module 110A generates control signals to be provided to respective switching elements included in the storage module 110A.

Further, the controller 140 of the storage module 110A is connected with the controller 140 of the storage module 110B, thereby communicating with each other.

The storage module 110B corresponds to the switching element SL2, the coil L2 and the current limiting circuit 112. A storage status of the secondary batteries B1-B4 of the storage module 110B is adjusted by the switching elements S11, S12, S21, S22, S31, S32, S41 and S42, the switching element SL2 and the current limiting circuit 112 included in the storage module 110B.

Further, the storage module 110B includes the cell voltage detecting circuit 130 and the controller 140 (not shown). The controller 140 of the storage module 110B generates a control signal SG2 to be provided to the switching element SL2 and the current limiting circuit 112. Also, the controller 140 of the storage module 110B generates control signals to be provided to respective switching elements included in the storage module 110B.

Further, the controller 140 of the storage module 110B is connected with the controller 140 of the storage module 110C, thereby communicating with each other.

The storage module 110C corresponds to the switching element SL3, the coil L3 and the current limiting circuit 113. A storage status of the secondary batteries B1-B4 of the storage module 110C is adjusted by the switching elements S11, S12, S21, S22, S31, S32, S41 and S42, the switching element SL3 and the current limiting circuit 113 included in the storage module 110C.

Further, the storage module 110C includes the cell voltage detecting circuit 130 and the controller 140 (not shown). The controller 140 of the storage module 110C generates a control signal SG3 to be provided to the switching element SL3 and the current limiting circuit 113. Also, the controller 140 of the storage module 110C generates control signals to be provided to respective switching elements included in the storage module 110C.

Further, the controller 140 of the storage module 110C is connected with the controller 140 of the storage module 110D, thereby communicating with each other.

The storage module 110D corresponds to the switching element SL4, the coil L4 and the current limiting circuit 114. A storage status of the secondary batteries B1-B4 of the storage module 110D is adjusted by the switching elements S11, S12, S21, S22, S31, S32, S41 and S42, the switching element SL4 and the current limiting circuit 114 included in the storage module 110D.

Further, the storage module 110D includes the cell voltage detecting circuit 130 and the controller 140. The controller 140 of the storage module 110D generates a control signal SG4 to be provided to the switching element SL4 and the current limiting circuit 114. Also, the controller 140 of the storage module 110D generates control signals to be provided to respective switching elements included in the storage module 110D.

As described above, in the storage battery pack 100 of the present embodiment, the controllers 140 included in respective storage modules are connected to be capable of communicating with each other.

Figure 2:
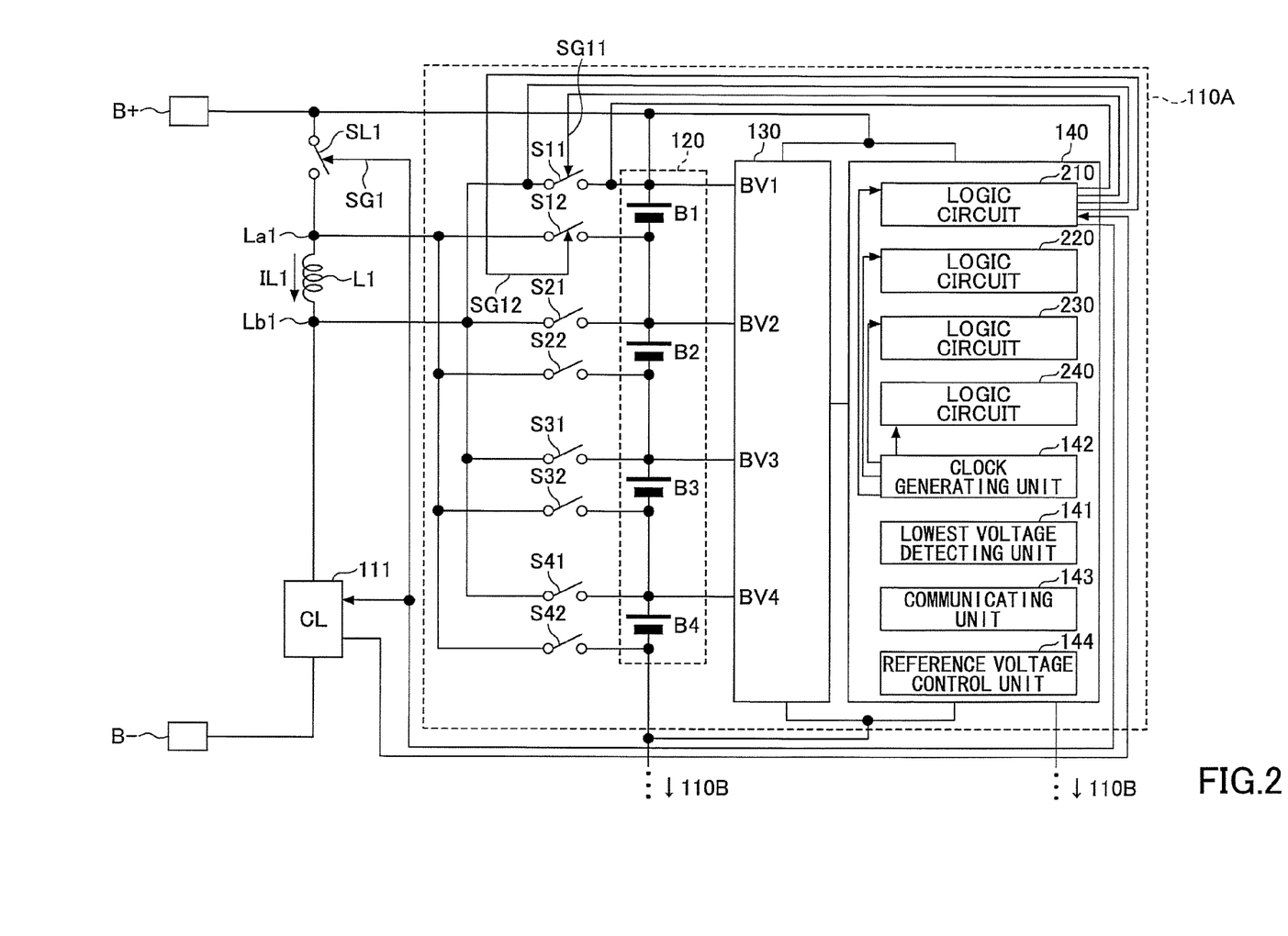
FIG. 2 is an illustrative drawing for illustrating a storage module and a storage status adjusting circuit.

In the following, the storage modules and the storage adjusting circuit 200 will be described with respect to FIG. 2. FIG. 2 is an illustrative drawing for illustrating a storage module and a storage status adjusting circuit.

In the present embodiment, storage modules 110A, 110B, 110C and 110D respectively have similar configurations; therefore, in FIG. 2, the storage module 110A is illustrated as an example of four storage modules.

In the storage module 110A, the cell voltage detecting circuit 130 detects respective cell voltages of the secondary batteries B1-B4, and outputs the detected cell voltages to the controller 140. Also, the cell voltage detecting unit 130 of the present embodiment detects a potential difference between both ends of (a string of) the secondary batteries B1-B4 connected in series. Herein below, the potential difference between both ends of the secondary batteries B1-B4 is referred to as a voltage of the assembled battery 120.

The controller 140 controls supply and shut-off of coil current IL1 of the coil L1. Further, the controller 140 of the present embodiment selects a secondary battery having the lowest cell voltage among the secondary batteries B1-B4, then lets the coil L1 release electricity accumulated in the coil L1 to supply electricity to the selected secondary battery.

More specifically, the controller 140 controls to connect the coil L1 between the B+ terminal and B− terminal thereby supplying coil current IL1 to the coil L1, then controls to shut off supplying coil current IL1 when a value of coil current IL1 reaches greater than or equal to a certain value, and controls to connects the coil L1 with the secondary battery having the lowest cell voltage. Additionally, the controller 140 of the present embodiment may detect a secondary battery to be connected with the coil L1 during when coil current IL1 is supplied to the coil L1.

The secondary batteries B1-B4 of the present embodiment are connected in series. A positive electrode of the secondary battery B1 is connected with the B+ terminal and one end of the switching element SL1, and a negative electrode of the secondary battery B4 is connected with a positive electrode of the secondary battery B1 of the storage module 110B.

One end of the switching element S11 is connected with the positive electrode of the secondary battery B1. Similarly, one end of the switching element S21 is connected with the positive electrode of the secondary battery B2, one end of the switching element S31 is connected with the positive electrode of the secondary battery B3, and one end of the switching element S41 is connected with the positive electrode of the secondary battery B4. The other ends of the switching elements S11, S21, S31 and S41 are connected with the connecting point Lb1.

In the present embodiment, one end of the switching element S12 is connected with the negative electrode of the secondary battery B1. Similarly, one end of the switching element S22 is connected with the negative electrode of the secondary battery B2, one end of the switching element S32 is connected with the negative electrode of the secondary battery B3, and one end of the switching element S42 is connected with the negative electrode of the secondary battery B4. The other ends of the switching elements S12, S22, S32 and S42 are connected with the connecting point La1.

That is, the switching elements S11 and S12 correspond to the secondary battery B1 and form a switching unit that controls connection/disconnection between the secondary battery B1 and the coil L1. Also, the switching elements S21 and S22 correspond to the secondary battery B2 and form a switching unit that controls connection/disconnection between the secondary battery B2 and the coil L1. The switching elements S31 and S32 correspond to the secondary battery B3 and form a switching unit that controls connection/disconnection between the secondary battery B3 and the coil L1. The switching elements S41 and S42 correspond to the secondary battery B4 and form a switching unit that controls connection/disconnection between the secondary battery B4 and the coil L1.

In the present embodiment, the cell voltage detecting unit 130 and the controller 140 are connected between the positive electrode of the secondary battery B1 and the negative electrode of the secondary battery B4.

The controller 140 of the present embodiment includes the logic circuits 210, 220, 230 and 240. Further, the controller 140 of the present embodiment includes a lowest voltage detecting unit 140, a clock generating unit 142, a communicating unit 143, and a reference voltage control unit 144.

In the present embodiment, the controller 140 of the storage module 110A shown in FIG. 2 serves as a highest order controller which performs controlling processes in higher order than the other controllers.

The logic circuit 210 of the present embodiment corresponds to the secondary battery B1, and controls supplied electricity to the secondary battery B1 from the coil L1 and shut-off therefrom. The logic circuit 220 of the present embodiment corresponds to the secondary battery B2, and controls supplied electricity to the secondary battery B2 from the coil L1 and shut-off therefrom. The logic circuit 230 of the present embodiment corresponds to the secondary battery B3, and controls supplied electricity to the secondary battery B3 from the coil L1 and shut-off therefrom. The logic circuit 240 of the present embodiment corresponds to the secondary battery B4, and controls supplied electricity to the secondary battery B4 from the coil L1 and shut-off therefrom.

The lowest voltage detecting unit 141 of the present embodiment detects the secondary battery having the lowest cell voltage among the secondary batteries B1-B4, and informs respective logic circuits of the detected result.

Specifically, the lowest voltage detecting unit 141 has provided the logic circuits 210, 220, 230 and 240 with a select notification signal with a low level (hereinafter referred to as L level), in advance. When the lowest voltage detecting unit 141 detects the secondary battery having the lowest cell voltage, the lowest voltage detecting unit 141 may invert level of the select notification signal, which is provided to the logic circuit corresponding to the detected secondary battery, to a high level (hereinafter referred to as H level).

The clock generating unit 142 of the present embodiment generates a clock signal to be provided to the logic circuits 210, 220, 230 and 240. The clock generating unit 142 of the present embodiment provides the clock signal of a certain frequency only to the logic circuit that corresponds to the secondary battery detected by the lowest voltage detecting unit 141, and the level of the clock signal may be fixed when the clock signals are provided to other logic circuits.

The communicating unit 143 of the present embodiment communicates with controllers 140 included in the storage modules 110B, 110C and 110D. More specifically, the communicating unit 143 receives information related to the voltage of the assembled battery 120 corresponding to other storage modules from the controllers 140 of other storage modules. Further, the communicating unit 143 of the present embodiment sends a voltage adjustment signal, generated by the reference voltage control unit 144 described below, to the controllers 140 of the other storage modules.

The reference voltage control unit 144 compares the voltage of the assembled battery 120 detected by the cell voltage detecting circuit 130 with the voltages of the assembled battery 120 of the storage modules 110B, 110C and 110D. Then, the reference voltage control unit 144 controls the amount of energy to be accumulated in coil L1 and coil L2, L3 and L4 respectively corresponding to the storage modules 110B, 110C and 110D, based on the comparison result. Specifically, the reference voltage control unit 144 generates a voltage adjustment signal to be provided to at least any one of the current limiting circuits 111, 112, 113 and 114. A detailed description of the process of the reference voltage control unit 144 will be given later.

The logic circuit 210 generates a signal SG1' that is a base of a control signal SG1 for controlling the switching element SL1 and a switching element SCL1 included in the current limiting circuit 111, a control signal SG11 for controlling the switching element S11, and a control signal SG12 for controlling the switching element S12. The logic circuit 220 generates the signal SG1', a control signal for controlling the switching element S21, and a control signal for controlling the switching element S22. The logic circuit 230 generates the signal SG1', a control signal for controlling the switching element S31, and a control signal for controlling the switching element S32. The logic circuit 240 generates the signal SG1', a control signal for controlling the switching element S41, and a control signal for controlling the switching element S42.

The controller 140 of the present embodiment has an OR circuit (not shown) whose input signal is the signal SG1' respectively generated by the logic circuits 210, 220, 230 and 240, and, an output signal of the OR circuit is the control signal SG1.

Additionally, in FIG. 1, only the connection between the logic circuit 210 and the switching element SL1, the connection between the logic circuit 210 and the current limiting circuit 111, the connections between the logic circuit 210 and the switching elements S11 and S12 are shown. In the storage battery pack 100 of the present embodiment, the connection between the logic circuit 220 and the switching element SL1, the connection between the logic circuit 220 and current limiting circuit 111, and the connections between the logic circuit 220 and the switching elements S21 and S22 are the same as the connection between the logic circuit 210 and the switching element SL1, the connection between the logic circuit 210 and the current limiting circuit 111, the connections between the logic circuit 210 and the switching elements S11 and S12. Also, the connection between the logic circuit 230 and the switching element SL1, the connection between the logic circuit 230 and current limiting circuit 111, and the connections between the logic circuit 230 and the switching elements S31 and S32 are the same as the connection between the logic circuit 210 and the switching element SL1, the connection between the logic circuit 210 and the current limiting circuit 111, the connections between the logic circuit 210 and the switching elements S11 and S12. Further, the connection between the logic circuit 240 and the switching element SL1, the connection between the logic circuit 240 and the current limiting circuit 111, and the connections between the logic circuit 240 and the switching elements S41 and S42 are the same as the connection between the logic circuit 210 and the switching element SL1, the connection between the logic circuit 210 and the current limiting circuit 111, the connections between the logic circuit 210 and the switching elements S11 and S12. A detailed description of the logic circuits 210, 220, 230 and 240 will be given later.

As described above, the controller 140 detects the secondary battery having the lowest cell voltage, then, outputs control signals for connecting the coil L1 with the detected secondary battery. In the present embodiment, through such an operation, electricity accumulated in the coil L1 is supplied to the secondary battery having the lowest cell voltage, thereby a storage status of the secondary batteries B1-B4 in the storage module 110A is adjusted.

In the following, the current limiting circuit 111 and the logic circuits 210, 220, 230 and 240 of the present embodiment will be described with respect to FIG. 3.

Figure 3:
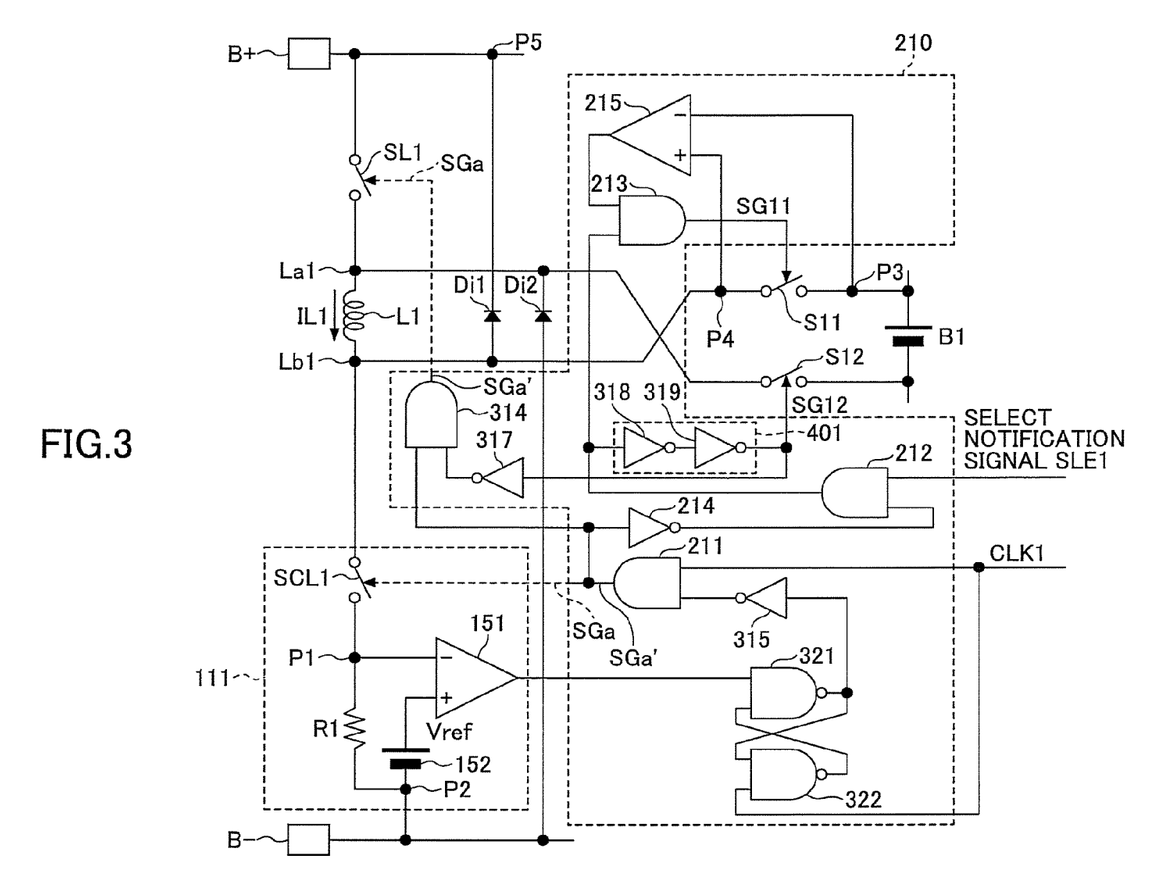
FIG. 3 is an illustrative drawing for illustrating an example of a current limiting circuit and a logic circuit.

FIG. 3 is an illustrative drawing for illustrating an example of a current limiting circuit and a logic circuit. Since the logic circuits 210, 220, 230 and 240 of the present embodiment respectively have identical configuration, the logic circuit 210 is shown as an example in FIG. 3. Additionally, the logic circuit 210 in FIG. 3 is an example of a circuit for performing an operation shown in a timing diagram in FIG. 4. The logic circuit 210 may only have a configuration for performing the operation shown in the timing diagram in FIG. 4.

The current limiting circuit 111 of the present embodiment includes a switching element SCL1, a resistor R1, a comparator 151 and a reference voltage generating unit 152.

One end of the switching element SCL1 is connected with the connecting point Lb1 and the other end of the switching element SCL1 is connected with the connecting point P1 at which an inverting input terminal of the comparator 151 and one end of the resistor R1 are connected. The switching elements SL1 and SCL1 of the present embodiment are controlled to be switched on-off by the control signals SGa (in FIG. 2, shown as SG1), respectively output from the logic circuit 210. That is, the switching elements SL1 and SCL1 of the present embodiment form a switching unit that controls connection/disconnection in series between the secondary batteries B1-B4 and the coil L1. In other words, the switching elements SL1 and SCL1 of the present embodiment form a switching unit that controls accumulation and release of electricity of the coil L1. The other end of the resistor R1 is connected with a connecting point P2 at which a negative electrode of the reference voltage generating unit 152 and the B− terminal are connected.

The reference voltage generating unit 152 generates a reference voltage Vref, and a positive electrode thereof is connected with the non-inverting input terminal of the comparator 151. An output signal of the comparator 151 is provided at one input terminal of a NAND circuit 321 described below.

The logic circuit 210 of the present embodiment includes AND circuits 211, 212, 213 and 314, NOT circuits 315, 214, 317, 318 and 319, a comparator 215, and NAND circuits 321 and 322.

The clock signal CLK1 output from the clock generating unit 142 is provided at one input terminal of the AND circuit 211 and an output signal of the NOT circuit 315 is provided at the other input terminal of the AND circuit 211. An output signal of the AND circuit 211 is provided to the NOT circuit 214. Also, the output signal of the AND circuit 211 is provided at one input terminal of the AND circuit 314.

Further, the output signal of the AND circuit 211 is provided, as the signal SGa', to the OR circuit (not shown) in the controller 140. An output signal of the OR circuit is provided, as the control signal SGa, to the switching element SCL1.

An output signal of the NOT circuit 214 is provided at one input terminal of the AND circuit 212. The select notification signal SLE1, output from the lowest voltage detecting unit 141, is provided at the other input terminal of the AND circuit 212.

An output signal of the AND circuit 212 is provided at an input terminal of the NOT circuit 318. An output signal of the NOT circuit 318 is provided at an input terminal of the NOT circuit 319. An output signal of the NOT circuit 319, as a control signal SG12 for controlling on-off of the switching element S12, is provided to the switching element S12. Also, the output signal of the NOT circuit 319 is provided at an input terminal of the NOT circuit 317. Additionally, in the present embodiment, the NOT circuit 318 and the NOT circuit 319 form a delay circuit 401.

The output signal of the AND circuit 212 is also provided at one input terminal of the AND circuit 213. An output signal of the comparator 215 is provided at the other input terminal of the AND circuit 213.

An output signal of the AND circuit 213 is provided, as a control signal SG11 for controlling on-off of the switching element S11, to the switching element S11.

An inverting input terminal of the comparator 215 is connected with one end of the switching element S11 being connected with the secondary battery B1. A connecting point between the inverting input terminal of the comparator 215 and one end of the switching element S11 is shown as a connecting point P3.

A non-inverting input terminal of the comparator 215 is connected with the other end of the switching element S11 being connected with the coil L1. A connecting point between the non-inverting terminal of the comparator 215 and the other end of the switching element S11 is shown as a connecting point P4.

In the present embodiment, the signal SGa', which is an output signal of the AND circuit 211, is provided at one input terminal of the AND circuit 314. An output signal of the NOT circuit 317 is provided at the other input terminal of the AND circuit 314. An output signal of the AND circuit 314 is provided, as the signal SGa', to the OR circuit (not shown) in the controller 140. An output signal of the OR circuit is provided, as the control signal SGa, to the switching element SL1.

In the present embodiment, the NAND circuit 321 and the NAND circuit 322 form a flip-flop. An output signal of the comparator 151 is provided at one input terminal of the NAND circuit 321 while an output signal of the NAND circuit 322 is provided at the other input terminal of the NAND circuit 321. The clock signal CLK1 output from the clock generating unit 142 is provided at one input terminal of the NAND circuit 322 while an output signal of the NAND circuit 321 is provided at the other input terminal of the NAND circuit 322. The output signal of the NAND circuit 321 is provided at an input terminal of the NOT circuit 315.

Also, in the present embodiment, one end of the switching element S11 is connected with an anode electrode of a diode Di1. A cathode electrode of the diode Di1 is connected with the positive electrode of the secondary battery B1 and the B+ terminal. A connecting point between the cathode electrode of the diode Di1 and the B+ terminal is shown as a connecting point P5. Further, one end of the switching element S12 is connected with a cathode electrode of a diode Di2. The anode electrode of the diode Di2 is connected with the negative electrode of the secondary battery B4 and the B− terminal.

Figure 4:
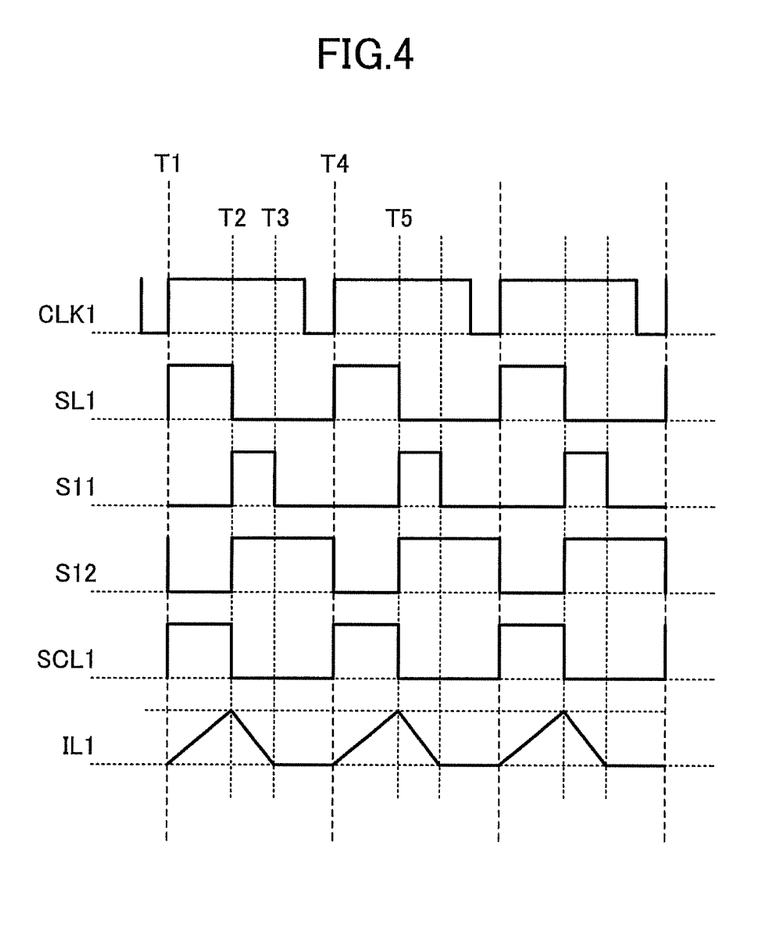
FIG. 4 is a timing diagram for illustrating an operation of a storage status adjusting circuit.

Herein below, an operation of the storage status adjusting circuit 200 of the present embodiment will be described with reference to FIG. 4. FIG. 4 is a timing diagram for illustrating an operation of a storage status adjusting circuit. In FIG. 4, an operation of the storage status adjusting circuit 200, in a case where the secondary battery B1 has been detected by the lowest voltage detecting unit 141, and a H level select notification signal has been provided to the logic circuit 210, is shown.

Additionally, in FIG. 4, an operation of switching elements only corresponding to the storage module 110A included in the storage status adjusting circuit 200 is described. In the storage status adjusting circuit 200 of the present embodiment, operations of other switching elements corresponding to other storage modules are respectively similar to that corresponding to the storage module 110A.

First, an operation of the storage adjusting circuit 200 at timing T1 will be described.

At timing T1, a H level clock signal CLK1 is provided. Signal level of an output signal of the comparator 151 is H level, since a voltage between connecting points P1 and P2 does not reach the reference voltage, at timing T1. Therefore, the signal level of an output signal of the AND circuit 211 becomes H level. That is, at timing T1, the signal level of the signal SG1' and the control signal SG1 become H level, then the switching elements SL1 and SCL1 are switched on to start to supply the coil current IL1 to the coil L1.

Also, through the NOT circuit 214, the output signal of the AND circuit 211 is inverted to L level to be provided at one input terminal of the AND circuit 212. The signal level of an output signal of the AND circuit 212 is L level, since a H level select notification signal is provided at the other input terminal of the AND circuit 212. That is, at timing T1, the signal level of the control signal SG12 becomes L level, then the switching element S12 is switched off.

An L level output signal of the AND circuit 212 is provided at one input terminal of the AND circuit 213. Therefore, the signal level of an output signal of the AND circuit 213 is L level regardless of the signal level of an output signal of the comparator 215. That is, at timing T1, the signal level of the control signal SG11 becomes L level, then the switching element S11 is switched off.

As described above, in the storage status adjusting circuit 200 of the present embodiment, at timing T1, the switching elements SL1 and SCL1 are switched on, while the switching elements S11 and S12 are switched off.

Thus, in the present embodiment, at timing t1, the coil L1 is connected in series with the secondary batteries B1 and B2 when, for example, the storage battery pack 100 is not connected with a battery charger. In this case, the coil current IL1 is supplied from the assembled batteries 120 of respective storage modules to the coil L1.

Therefore, in the present embodiment, in a case where a load is connected with the storage battery pack 100, further, even in a case where neither a load nor a battery charger is connected with the storage battery pack 100, averaging cell voltages of the secondary batteries B1-B4 included in the storage module 110A can be performed through the operation of the storage status adjusting circuit 200.

Meanwhile, through the B+ terminal and the B− terminal, both ends of the coil L1 are connected with a battery charger when, for example, the storage battery pack 100 is connected with the battery charger. In this case, the coil current IL1 is supplied from the battery charger to the coil L1.

In the following, an operation of the storage status adjusting circuit 200 at timing T2 will be described. At timing T2, the coil current IL1 is supplied to the coil L1, wherein the voltage between the connecting points P1 and P2 reaches the reference voltage. At timing T2, an output signal of the comparator 151 is inverted from H level to L level. Therefore, at timing T2, an output signal of the AND circuit 211 is inverted to L level regardless of the signal level of the clock signal CLK1.

That is, at timing T2, the signal level of signal SG1' becomes L level, and the signal level of signal SG1 also becomes L level, then the switching elements SL1 and SCL are switched off to stop supplying the coil current IL1 to the coil L1.

Additionally, at timing T2, the signal levels of signals SG1' respectively output from the logic circuit 220, 230 and 240 are all L level. A detailed description of operations of the logic circuits other than a logic circuit being provided with the H level select notification signal (logic circuits 220, 230 and 240, at timing T2) will be given later.

Also, through the NOT circuit 214, the output signal of the AND circuit 211 is inverted to H level to be provided at one input terminal of the AND circuit 212. The signal level of an output signal of the AND circuit 212 becomes H level, since a H level select notification signal SLE1 is provided at the other input terminal of the AND circuit 212. That is, at timing T2, the signal level of the control signal SG12 becomes H level, then the switching element S12 is switched on.

A H level output signal of the AND circuit 212 is provided at one input terminal of the AND circuit 213. In this case, an electric potential at the connecting point P4 is higher than an electric potential at the connecting point P3, since electricity is accumulated in the coil L1. Therefore, the signal level of an output signal of the comparator 215 becomes H level.

Thus, an output signal of the AND circuit 213 is inverted from L level to H level. That is, at timing T2, the signal level of a control signal SG11 becomes H level, and the switching element S11 is switched on.

As described above, in the storage status adjusting circuit 200 of the present embodiment, at timing T2, the switching elements SL1 and SCL1 are switched off, while the switching elements S11 and S12 are switched on. Through this operation, in the storage status adjusting circuit 200 of the present embodiment, the secondary battery B1, which has been detected by the lowest voltage detecting unit 141, is connected with the coil L1 to release electricity (energy) accumulated in the coil L1 to the secondary battery B1.

In the following, an operation of the storage status adjusting circuit 200 at timing 13 will be described. At timing 13, release of electricity from the coil L1 to the secondary battery B1 is finished. In the present embodiment, the timing at which release of electricity from the coil L1 is finished is detected based on a potential difference between the connecting point P3 and the connecting point P4. More specifically, in the present embodiment, an electrical potential at connecting point P3 is compared with an electrical potential at connecting point P4 by the comparator 215. Then, the storage status adjusting circuit 200 switches off the switching element S11 by an output signal of the comparator 215, when the electrical potential at the connecting point P3 becomes higher than the electrical potential at the connecting point P4, thereby disconnects the coil L1 from the secondary battery B1. In the present embodiment, through such controlling of the switching element S11, energy back flow from the secondary battery B1 to the coil L1 is prevented.

At timing T3, when the electric potential at the connecting point P3 is higher than the electric potential at the connecting point P4 through release of electricity from the coil L1 to the secondary battery B1, an output signal of the comparator 215 is inverted from H level to L level. Therefore, an output signal of the AND circuit 213 is inverted from H level to L level. That is, at timing T3, the signal level of the control signal SG11 becomes L level, and the switching element S11 is switched off to disconnect the coil L1 from the secondary battery B1.

As described above, in the storage adjusting circuit 200 of the present embodiment, in a term between timing T2 and timing T3, electricity accumulated in the coil L1 is supplied to the secondary battery B1 to charge the secondary battery B1.

Additionally, in the present embodiment, at timing T3, the switching elements SL1 and SCL1 remain to be switched off while the switching element S12 remains to be switched on. In the present embodiment, the timing at which the control signal SG1 is inverted to H level (the timing at which the switching elements SL1 and SCL1 are switched on) is determined based on the clock signal CLK1.

Further, in the present embodiment, the control signal SG1 is a signal in reverse phase to the control signal SG12. Therefore, the control signal SG12 is inverted from H level to L level in synchronization with a timing at which the control signal SG1 is inverted from L level to H level. That is, the switching element S12 is switched off in synchronization with a timing at which the switching elements SL1 and SCL1 are switched on.

At timing T4, when the signal level of the clock signal CLK1 becomes H level, similarly to the case of timing T1, the switching elements SL1 and SCL1 are switched on while the switching element S12 is switched off. Additionally, at this timing, from timing T3, the switching element S11 remains switched off.

That is, at timing T4, an operation of the storage status adjusting circuit 200 of the present embodiment is similar to that at timing T1, the coil current IL1 starts to be supplied to the coil L1.

The lowest voltage detecting unit 141 of the present embodiment may detect a secondary battery having the lowest cell voltage during a term between timing T3 and timing T4 at which the clock signal CLK1 next rises. Also, the lowest voltage detecting unit 141 may detect a secondary battery having the lowest cell voltage during a term between timing T3 and timing T5 at which supply of the coil current IL1 to the coil L1 is stopped. The lowest voltage detecting unit 141 of the present embodiment, for example, may detect a secondary battery having the lowest cell voltage in every certain interval.

Further, in FIG. 4, the operation of the switching elements SL1 and SCL1 and the switching elements S11 and S12 that are controlled by the logic circuit 210 is illustrated, while illustration of the operation of the switching elements that are controlled by the logic circuits 220, 230 and 240 is omitted.

In an example of FIG. 4, the logic circuits 220, 230 and 240 respectively control the switching elements S21 and S22, the switching elements S31 and S32, and the switching elements S41 and S42 to be switched off.

Then, the logic circuit 220, for example, if the lowest voltage detecting unit 141 detects the secondary battery B2 after timing T3 shown in FIG. 4, performs a similar operation to an operation of the logic circuit 210 as described above. That is, the logic circuit 220 controls on-off of the switching elements SL1 and SCL1 and the switching elements S21 and S22 to release electricity accumulated in the coil L1 to the secondary battery B2. Meanwhile, the logic circuits 210, 230 and 240 respectively control the switching elements S11 and S12, the switching elements S31 and S32, and the switching elements S41 and S42 to be switched off.

Herein below, an operation of the logic circuit 210, in a case where a secondary battery other than the secondary battery B1 is detected by the lowest voltage detecting unit 141, will be described.

The lowest voltage detecting unit 141 of the present embodiment provides H level select notification signal SEL1 with a logic circuit which corresponds to the detected secondary battery, while providing L level select notification signal SEL1 with logic circuits other than the logic circuit which corresponds to the detected secondary battery.

Further, the clock generating unit 141 of the present embodiment provides the clock signal CLK1 being fixed at a signal level thereof to L level with the logic circuits other than the logic circuit which corresponds to the secondary battery detected by the lowest voltage detecting unit 141.

Therefore, in a case where the lowest voltage detecting unit 141 does not detect the secondary battery B1, the clock signal CLK1, which is provided at one input terminal of the AND circuit 211, is fixed to L level, and an output signal of the AND circuit 211 is also fixed to L level. Thus, the signal SG1' is also fixed to L level.

Further, in the logic circuit 212, the select notification signal SLE1, which is provided at one input terminal of the AND circuit 212, is fixed to L level, and an output signal of the AND circuit 212 is also fixed to L level. Thus, an output signal of the AND circuit 213 is fixed to L level, the control signals SG11 and SG12 become L level, and the switching elements S11 and S12 are switched off.

As described above, in the storage status adjusting circuit 200 of the present embodiment, the switching elements SL1 and SCL1 are switched on in synchronization with a rising edge of the clock signal CLK1, and the coil L1 is connected between the B+ terminal and the B− terminal to accumulate electricity in the coil L1. Also, in the storage status adjusting circuit 200 of the present embodiment, the switching elements S11, S12, S21, S22, S31, S32, S41 and S42 are operated so as to connect the coil L1 with a secondary battery having the lowest cell voltage when electricity accumulated in the coil L1 reaches a certain value.

That is, in the present embodiment, a closed loop is formed by connecting the coil L1 with a secondary battery having the lowest cell voltage, which is detected in every certain interval, then, in this closed loop, electricity accumulated in the coil L1 is supplied to the secondary battery to charge the secondary battery.

The storage status adjusting circuit 200 of the present embodiment can adjust the storage status through the operation described above to charge only the secondary battery having the lowest cell voltage among the plurality of the secondary batteries. Further, the storage adjusting circuit 200 of the present embodiment can adjust the storage status of a plurality of the secondary batteries using one coil. Thus, the present embodiment can greatly contribute to downsizing compared to a transformer-type, and this advantageous effect becomes more remarkable, especially, in a case where a larger current has to be controlled. Also, it is known that energy-loss is caused by a transformer not only with load but also without load; then, the present embodiment can eliminate energy-loss caused by transformers.

Figure 5:
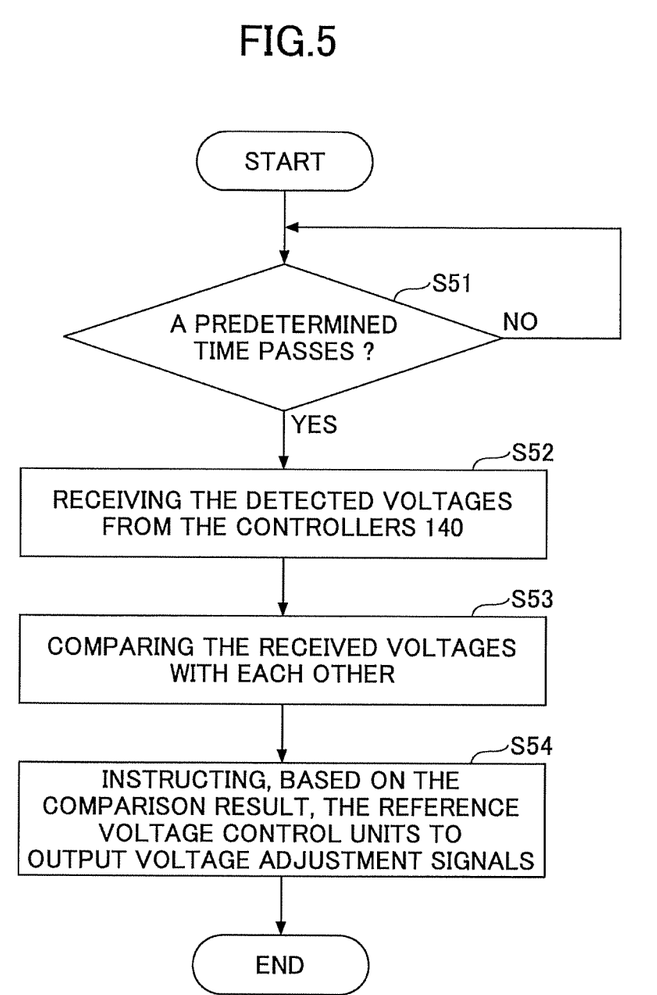
FIG. 5 is a flowchart for illustrating the process performed by a reference voltage control unit.

In the following, a process performed by the reference voltage control unit 144 included in the controller 140 of the storage module 110A will be described with respect to FIG. 5. In FIG. 5, an operation of the reference voltage control unit 144 in a case where the controller 140 of the storage module 110A serves as the highest order controller which performs controlling processes in higher order than the other controllers 140 included in respective storage modules 110B, 110C and 110D.

The reference voltage control unit 144 of the present embodiment determines whether a predetermined time passes from a timing of previous output of the voltage adjustment signal (step S51). If the predetermined time does not pass, in step S51, the reference voltage control unit 144 waits until the predetermined time passes.

If a predetermined time passes, in step S51, the reference voltage control unit 144 receives the voltages of the assembled battery 120 corresponding to respective storage modules, through the communicating unit 143, from the controllers 140 of the respective storage modules (step S52). At this time, the reference voltage control unit 144 also receives the voltage of the assembled battery 120 of the storage module 110A. That is, the reference voltage control unit 144 receives, in step S52, four voltages of the assembled battery 120 corresponding to respective storage modules 110A-110D.

Next, the reference voltage control unit 144 compares the four received voltages of the assembled battery 120 with each other (step S53).

For example, the reference voltage control unit 141 of the present embodiment may set the voltage of the assembled battery 120 corresponding to the storage module 110A as a reference, and compare the voltage of the assembled battery 120 set as the reference with other three voltages of the assembled battery 120. Also, for example, the reference voltage control unit 141 may calculate an average of the four voltages of the assembled battery 120 and set the average as a reference, then compare the four voltages of the assembled battery 120 with the average. Further, for example, the reference voltage control unit 144 of the present embodiment may set a highest voltage of the assembled battery 120 or a lowest voltage of the assembled battery 120 among the four voltages of the assembled battery 120 as a reference, and compare the voltage of the assembled battery 120 set as the reference with other three voltages of the assembled battery 120.

Next, the reference voltage control unit 144 instructs, based on the comparison result, the reference voltage control units 144 included in the controllers 140 of respective storage modules to output voltage adjustment signals to be provided to reference voltage generating units of the current limiting circuits corresponding to respective storage modules (step S54).

For example, in a case where the voltage of the assembled battery 120 corresponding to the storage module 110A has been set as the reference, the reference voltage control unit 144 of the present embodiment detects an assembled battery (or batteries) 120 having the voltage of the assembled battery 120 which is less than, by a certain value or more, the voltage of the reference. Then, the reference voltage control unit 144 instructs the controller (or controllers) 140 of the storage module (or modules), which corresponds to the assembled battery (or batteries) 120 having the voltage of the assembled battery 120 which is less than, by a certain value or more, the voltage of the reference, to output the voltage adjustment signal, wherein the reference voltage of the current limiting circuit corresponding to the instructed controller 140 is raised according to the difference between the voltage of the reference and the voltage of the assembled battery 120 which is less than, by a certain value or more, the voltage of the reference with reference to the output voltage adjustment signal.

The reference voltage control unit 144 of the present embodiment can quickly charge the assembled battery 120 having the voltage less than, by a certain value or more, the voltage of the reference, for example, outputting such a voltage adjustment signal described above, thereby reducing the difference between the voltage of the assembled battery 120 and the voltage of the reference.

The reference voltage control unit 144 of the present embodiment may control similarly, in a case where the average of the four voltages of the assembled battery 120 is set as a reference. Specifically, for example, the reference voltage control unit 144 of the present embodiment detects an assembled battery (or batteries) 120 having the voltage of the assembled battery 120 which is less than, by a certain value or more, the voltage of the reference. Then, the reference voltage control unit 144 instructs the controller (or controllers) 140 of the storage module (or modules) corresponding to the detected assembled battery (or batteries) to output the voltage adjustment signal, wherein the reference voltage of the current limiting circuit is raised so that the voltage of the assembled battery 120 becomes closer to the average with reference to the output voltage adjustment signal.

As described above, in the present embodiment, the voltages of the assembled battery 120 can also be averaged among respective storage modules.

Second Embodiment

Herein below, a second embodiment will be described with reference to the drawings. In the second embodiment, a diode is used to prevent energy back flow from secondary batteries to coils, which is different from the case of the first embodiment. Therefore, in the description of the second embodiment below, only the difference between the second embodiment and the first embodiment will be described; an identical reference numeral will be applied to elements or the like that have similar functions and configurations to those of in the first embodiment, and descriptions thereof will be omitted.

Figure 6:
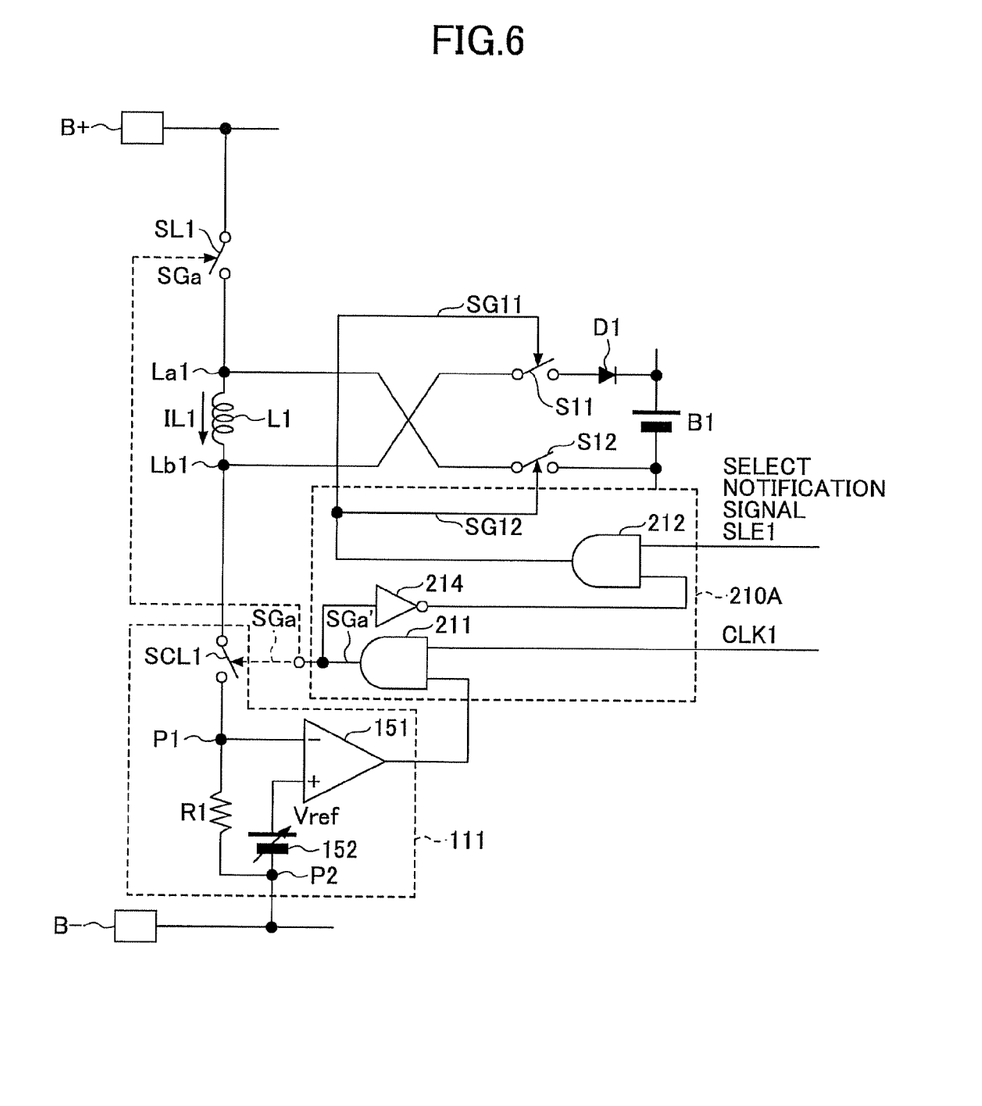
FIG. 6 is an illustrative drawing for illustrating another example of a current limiting circuit and a logic circuit.

FIG. 6 is an illustrative drawing for illustrating another example of a current limiting circuit and a logic circuit.

Additionally, in the present embodiment, logic circuits included in the controller 140 have similar functions; therefore, in FIG. 6, a logic circuit 210A is illustrated as an example of four logic circuits.

In the present embodiment, a diode D1 is disposed between one end of a switching element S11 and a positive electrode of a secondary battery B1. Additionally, in the storage status adjusting circuit of the present embodiment, a diode is respectively disposed, similarly to a configuration shown in FIG. 6, between one end of a switching element S21 and a positive electrode of a secondary battery B2, between one end of a switching element S31 and a positive electrode of a secondary battery B3, and between one end of a switching element S41 and a positive electrode of a secondary battery B4.

The logic circuit 210A of the present embodiment includes AND circuits 211 and 212, and a NOT circuit 214. In the present embodiment, an output signal of the AND circuit 212 is respectively provided, as control signals SG11 and SG12, to the switching element S11 and the switching element S12.

Therefore, in the present embodiment, a control signal SG11 and a control signal SG12 are signals in reverse phase to the control signal SG1.

Figure 7:
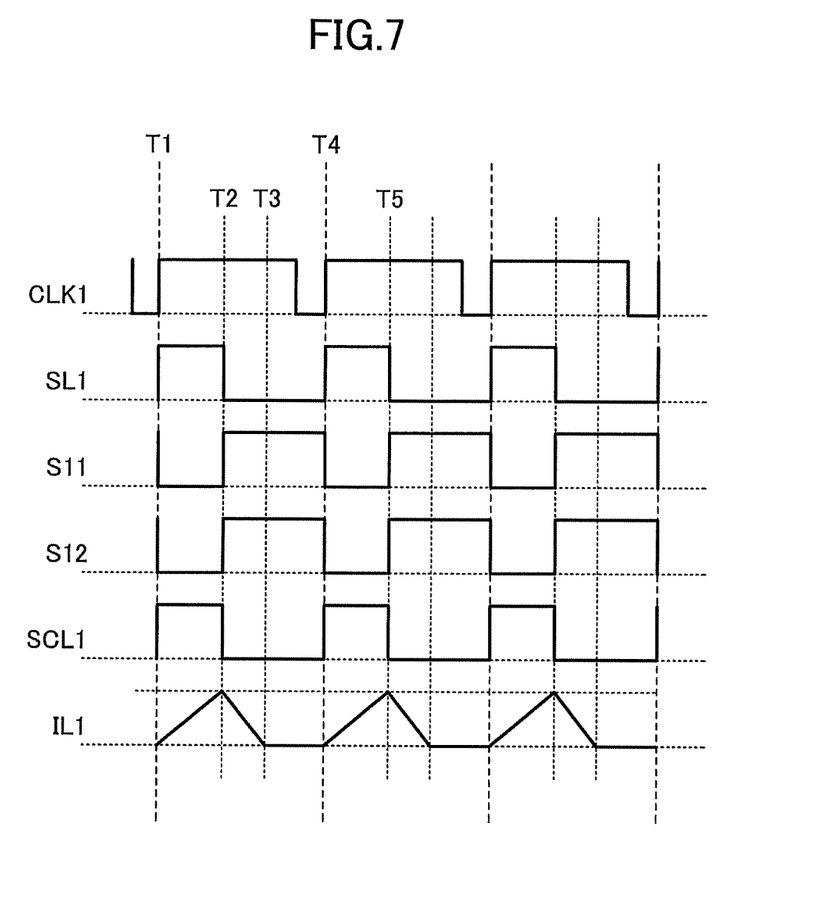
FIG. 7 is another timing diagram for illustrating an operation of a storage status adjusting circuit.

FIG. 7 is another timing diagram for illustrating an operation of a storage status adjusting circuit. In the present embodiment, as shown in FIG. 7, control signal SG11 and control signal SG12, for controlling a timing at which the switching elements S11 and S12 are switched on/off, are inverted signals of the control signal SG1, for controlling a timing at which switching elements SL1 and SCL1 are switched on/off.

Further, in the present embodiment, energy back flow is prevented by the diode D1, when an electric potential at a connecting point of the secondary battery B1 and diode D1 is higher than an electric potential at a connecting point of the switching element S11 and diode D1. Therefore, in the present embodiment, the coil current IL1 never has a negative value.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

The present application is based on Japanese Priority Application No. 2014-052944 filed on Mar. 17, 2014, the entire contents of which are hereby incorporated herein by reference.

What is claimed is:

1. A storage status adjusting circuit including two or more modules to control energy accumulation in, and energy release from, plural respective coils to plural assembled electric storage devices respectively, each assembled electric storage device including plural component electric storage devices connected serially to each other, each of the two or more modules comprising:
plural switching units to selectively connect respective component electric storage devices of a corresponding assembled electric storage device to a corresponding coil;
a voltage detection circuit to detect voltages of the component electric storage devices of the corresponding assembled electric storage device;
a controller to set a reference voltage based on comparison amongst the detected voltages of the component electric storage devices of the corresponding assembled electric storage device; and
a coil voltage adjusting circuit to control an amount of energy accumulated in the corresponding coil based on the reference voltage set by the controller,
wherein each of the modules further comprises a first switching unit to switch between energy accumulation and energy release of the corresponding coil,
wherein the plural switching units connect or disconnect the respective component electric storage devices with the coil,
wherein the plural switching units disconnect the respective component electric storage devices from the corresponding coil when the first switching unit is switched to energy accumulation of the corresponding coil, and
wherein any one of the plural switching units connects the corresponding component electric storage device with the corresponding coil when the first switching unit is switched to energy release of the corresponding coil.

2. The storage status adjusting circuit, as claimed in claim 1, wherein at least one of the two or more modules acts as a primary module whose controller controls each coil voltage adjusting circuit amongst the two or more modules, and wherein a potential difference between (i) a voltage of the corresponding coil of the primary module and (ii) the reference voltage set in of the primary module is greater than or equal to a predetermined value.

3. The storage status adjusting circuit, as claimed in claim 2, wherein the reference voltage corresponds to a voltage of any assembled electric storage device amongst the plural assembled electric storage devices.

4. The storage status adjusting circuit, as claimed in claim 2, wherein the reference voltage is an average of the voltages of the plural assembled electric storage devices.

5. A storage status adjusting device, to control energy accumulation in, and energy release from, a coil to an assembled electric storage device including plural component electric storage devices connected serially to each other, the storage status adjusting device comprising:
plural switching units to selectively connect the respective component electric storage devices of the assembled electric storage device to a corresponding coil;
a voltage detection circuit to detect voltages of the component electric storage devices of the assembled electric storage device;
a controller to set a reference voltage based on comparison amongst the detected voltages of the component electric storage devices of the assembled electric storage device;
a coil voltage adjusting circuit to control an amount of energy accumulated in the coil based on the reference voltage set by the controller; and
a first switching unit to switch between energy accumulation and energy release of the coil,
wherein the plural switching units connect or disconnect the respective component electric storage devices with the coil,
wherein the plural switching units disconnect the respective component electric storage devices from the corresponding coil when the first switching unit is switched to energy accumulation of the corresponding coil, and
wherein any one of the plural switching units connects the corresponding component electric storage device with the corresponding coil when the first switching unit is switched to energy release of the corresponding coil.

6. A storage battery pack, comprising:
plural coils;
plural assembled electric storage devices, each assembled electric storage device including plural component electric storage devices connected serially to each other;
plural modules to control energy accumulation in, and energy release from, the plural respective coils to the plural assembled electric storage devices respectively, each of the plural modules including:
plural switching units to selectively connect respective component electric storage devices of a corresponding assembled electric storage device to a corresponding coil;
a voltage detection circuit to detect voltages of the component electric storage devices of the corresponding assembled electric storage device;
a controller to set a reference voltage based on comparison amongst the detected voltages of the component electric storage devices of the corresponding assembled electric storage device; and
a coil voltage adjusting circuit to control an amount of energy accumulated in the corresponding coil based on the reference voltage set by the controller,
wherein each of the modules further comprises a first switching unit to switch between energy accumulation and energy release of the corresponding coil,
wherein the plural switching units connect or disconnect the respective component electric storage devices with the coil,
wherein the plural switching units disconnect the respective component electric storage devices from the corresponding coil when the first switching unit is switched to energy accumulation of the corresponding coil, and
wherein any one of the plural switching units connects the corresponding component electric storage device with the corresponding coil when the first switching unit is switched to energy release of the corresponding coil.

* * * * *